United States Patent

Laue

[15] 3,701,534

[45] Oct. 31, 1972

[54] PHOTOELECTRIC SWITCHING DEVICE FOR RECORD PLAYERS

[72] Inventor: Eckhard Laue, St. Georgen, Black Forest, Germany

[73] Assignee: DUAL Gebruder Steidinger, St. Georgen/Schwarzwald, Germany

[22] Filed: Nov. 25, 1969

[21] Appl. No.: 879,694

[30] Foreign Application Priority Data

Nov. 26, 1968 Germany..........P 18 10 983.6

[52] U.S. Cl...................................274/1 L, 274/15 R

[51] Int. Cl.............................................G11b 19/14

[58] Field of Search..........274/1, 15; 250/237 G, 232

[56] References Cited

UNITED STATES PATENTS

| | | | |
|---|---|---|---|
| 2,602,668 | 7/1952 | Finneran et al | 274/15 |
| 3,524,067 | 8/1970 | West | 250/237 G |
| 2,056,372 | 10/1936 | Schwartz | 274/1 |
| 2,085,582 | 6/1937 | Guedon | 274/1 L |

*Primary Examiner*—Harry N. Haroian
*Attorney*—Ernest G. Montague

[57] ABSTRACT

A light electric switching device for a record playing apparatus, which comprises a tone arm which is swingably mounted about a vertical axis for sensing the surface of a record. A mirror is secured close to the vertical axis of the tone arm and with its plane perpendicular to a radial plane of the vertical swinging axis of said tone arm. A light source and a light electric transmitter are provided, to constitute two elements. Both elements are immovably disposed on the record playing device and disposed opposite the mirror, such that a light beam emitted from said light source reflected from the mirror impinges upon the light sensitive transmitter, as soon as the tone arm is disposed within the range of the exit groove of the record.

1 Claim, 1 Drawing Figure

PATENTED OCT 31 1972
3.701.534
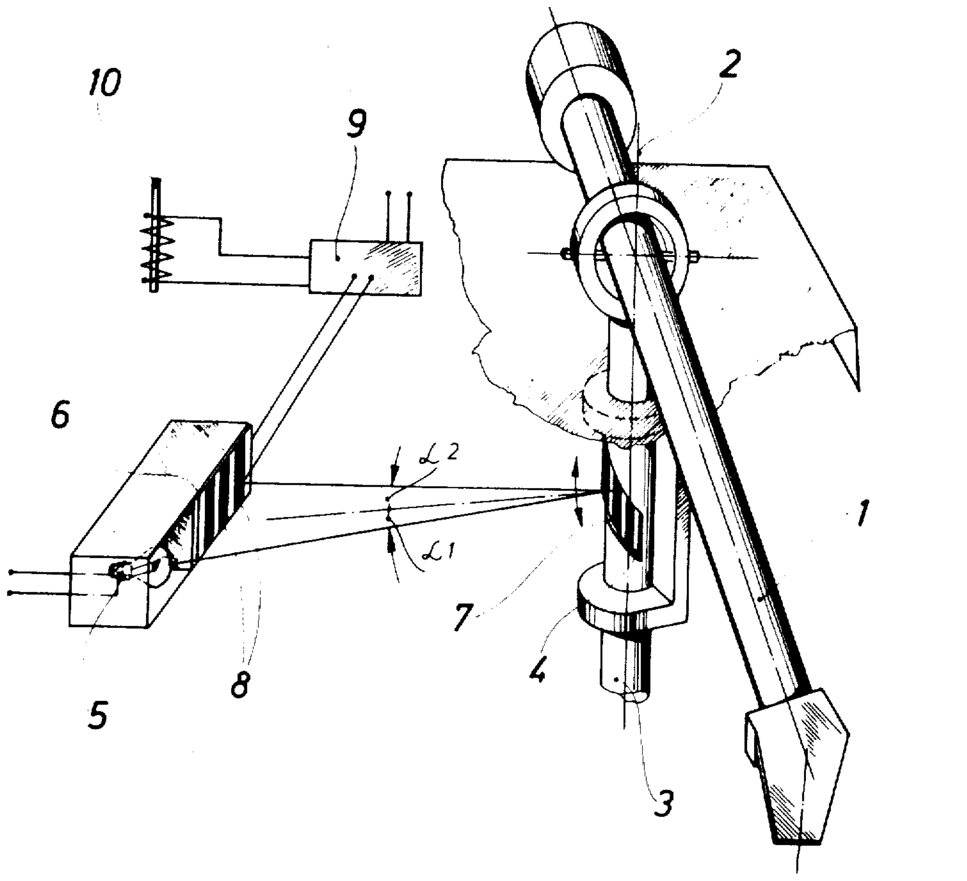
INVENTOR
Eckhard Laue
By Ernest G. Montague
Attorney

PHOTOELECTRIC SWITCHING DEVICE FOR RECORD PLAYERS

The present invention relates to a photoelectric switching device for a record player with a swingable tone arm for the purpose of record sensing and which comprises an immovably disposed light source, a likewise immovably disposed light sensitive cell and a mirror coupled with the sensing movement of the tone arm, which mirror is disposed preferably perpendicularly to a radial plane of the swinging axis of the tone arm and directs the light beam within the switching range of the tone arm from the light source towards the light sensitive cell.

The purpose of such a switching device resides in the arrangement to switch off the driving motor or to put into operation the change gear for a disc changer, as soon as the sensing needle of the tone-pick-up runs into the exit groove of the record disc, which groove has an appreciably higher pitch than the tone groove, whereby a mechanical reaction onto the tone arm is avoided. For release of the switching process, a different light stream variation or the variation of a light stream impulse succession can be applied by means of a corresponding amplification.

In the known arrangement the mirror is disposed directly on the tone arm head and the light source and the light sensitive cell is provided at the socket of the tone arm. Aside from the fact, that the arrangement of a mirror at the tone arm head is hindered in many cases and the mirror constitutes an additional mass, such apparatus, since it must be above the record player, it must lead to error circuits by foreign entrance light beams or relatively high light beams must be used.

Another previously known switching device uses for the control of the light beam a diaphragm connected with the tone arm, which diaphragm swings within the switching range of the tone arm between the light source and the light sensitive cell. The variation difference of the light stream corresponding with the pitch difference between the tone groove and the run-out groove is given though by the pitch ratio of both grooves. The pitches are, however, relatively small per se, so that a relatively large electric amplification must take place. The speed can be held relatively large by the use of a diaphragm due to the fact, that the diaphragm sits on a long lever arm. This requires, however, an additional mass for the tone arm.

It is one object of the present invention to provide a photoelectric switching device for record players, wherein the effectiveness of the switching device is increased without additional provisions in comparison with the previously known devices and the inert mass relative to the swinging axis of the tone arm is reduced.

It is another object of the present invention to provide a photoelectric switching device for record players wherein a mirror is disposed adjacent to the pivot axis of the tone arm.

It is another object of the present invention to provide a photoelectric switching device for record players wherein the mirror is equipped with non-reflecting stripes arranged crosswise to the direction of movement and disposed at a predetermined spacing from each other and comprises an arrangement according to which the light sensitive cell is covered up with corresponding or complementary stripes.

The use of a mirror carrying a cover strip has the purpose of causing by the movement of the mirror, an alternate light-dark-illumination of the light sensitive cell and of using the height of the frequency as criterion for the release of the switching process. If the light sensitive cell is without a cover stripe, only the light stream of a non-covered-up stripe of the mirror can be effective on the light sensitive cell. If the light sensitive cell contains, however, a greater number of covering stripes, the light beams of a plurality of light stripes can be in parallel upon the cell and be covered up, respectively, which leads in a simple manner to a larger exploitation of the light source.

With these and other objects in view, which will become apparent in the following detailed description, the present invention, which is shown by example only, will be fully understood in connection with the accompanying drawing, in which the only FIGURE is a perspective view of a tone arm with essential parts of the switching device disclosed schematically.

Referring now to the drawing, a tone arm 1 is swingably mounted about a vertical axis 2. On a bearing part 3 a mirror 4 is provided close to the axis 2 and performs the swinging movement of the tone arm 1. From an immovable light source 5, the light stream is reflected by means of the mirror 4 onto the light sensitive cell 6, as soon as the tone arm 1 reaches the position, where it can find as early as possible a run-out groove. Since the angle of incidence $\alpha_1$ of a light beam transmitted towards the mirror 4 is equal to the angle of defection of $\alpha_2$, the reflected light beam moves with a double angular speed of the mirror 4 in the tone arm 1, respectively, that means the light-shade-limits decisive for the switching process moves with increased speed. A further increase is possible by the enlargement of the distance of the light sensitive cell 6 from the mirror 4, without thereby increasing the mass inertia of the tone arm.

The shown device is arranged for a response to variation of a light impulse succession. The mirror 4 is equipped with non-reflecting stripes 7 and the light sensitive cell 6 is covered up with corresponding stripes 8, so that upon movement of the reflected light-shade field on the surface of the light sensitive cell 6 for the distance of the stripes 8, a light-dark effect results and an electric impulse, respectively, is produced. If the impulse succession reaches a predetermined frequency, the desired switching process is released by means of an amplifier 9, which controls the circuit of a lifting magnet 10. If the switching device is used for a record player without a disc changer, the current for the driving motor can be controlled by means of the amplifier also purely electronically.

While I have disclosed one embodiment of the present invention, it is to be understood that this embodiment is given by example only and not in a limiting sense.

I claim:

1. A light electric switching device for a record playing apparatus, comprising a rod pivotally mounted about a vertical axis, a tone arm operatively mounted to said rod for pivoting about said vertical axis and for sensing the surface of a record, a mirror secured on said rod of said tone arm and with its plane perpendicular to a radial plane of said vertical axis of said tone arm and said mirror pivoting with the pivoting of said tone arm, a light source and a photo electric transmitter constituting two elements, both of said two elements being immovably disposed on said record playing apparatus and disposed at a position opposite to said mirror, such that a light beam emitted from said light source reflected from said mirror impinges upon said photo electric transmitter, as soon as said tone arm is disposed within the range of the exit groove of said record, said mirror contains at least one non-reflecting stripe disposed crosswise to its direction of movement, and said photo electric transmitter contains non-transparent stripes on its light-sensitive surface corresponding with said non-reflecting stripes of said mirror.

* * * * *